A. BOERNER.
RESILIENT TIRE FOR VEHICLE WHEELS.
APPLICATION FILED MAR. 27, 1917.

1,285,605.

Patented Nov. 26, 1918.
2 SHEETS—SHEET 1.

A. Boerner
Inventor
By Albert Clarke
Attorney.

A. BOERNER.
RESILIENT TIRE FOR VEHICLE WHEELS.
APPLICATION FILED MAR. 27, 1917.
1,285,605.
Patented Nov. 26, 1918.
2 SHEETS—SHEET 2.
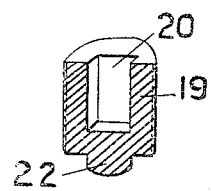
FIG. 9.
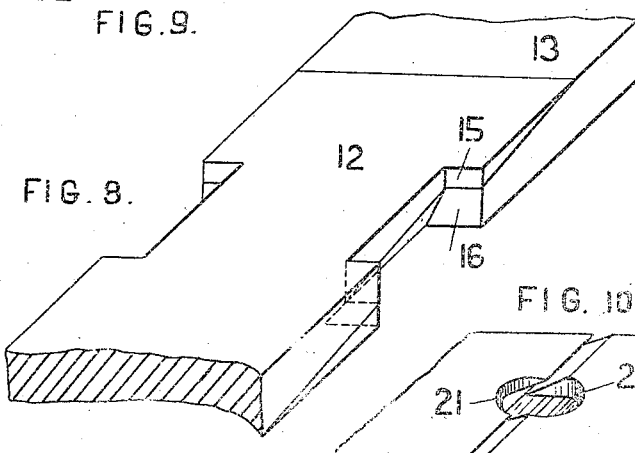
FIG. 8.
FIG. 10.
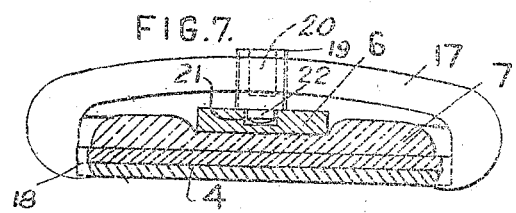
FIG. 7.
A. Boerner
Inventor
By Albert E Parker
Attorney.

UNITED STATES PATENT OFFICE.

ARNO BOERNER, OF SCHEVENINGEN, NETHERLANDS.

RESILIENT TIRE FOR VEHICLE-WHEELS.

1,285,605.

Specification of Letters Patent.

Patented Nov. 26, 1918.

Application filed March 27, 1917. Serial No. 157,612.

*To all whom it may concern:*

Be it known that I, ARNO BOERNER, residing at 37 Zeekant, Scheveningen, the Netherlands, have invented certain new and useful Improvements in Resilient Tires for Vehicle-Wheels, of which the following is a specification.

The present invention relates to a new improved tire for a vehicle wheel of the type comprising a flexible outer cover, a resilient ring formed to fit within said cover, and a metal band adapted to exert a pressure against the inner periphery of said ring. The metal band in such tires, which is generally composed of a plurality of segments in order that it may easily be mounted in place, has the disadvantageous feature that the connections between these segments are liable to be pressed outward and so to damage the rubber or like ring interposed between the band and the cover, owing to the fact that the band may be subjected to considerable pressure stresses. This inconvenience might be removed by making the band comparatively thick, but this would materially interfere with the resiliency of the tire.

Now, in order to obviate these defects, I provide for an additional metal band located within the first mentioned band and having for its purpose to exert a strong pressure on same and to expand it: the outer band will thereby always be subjected to tensional stress, even when the wheel is heavily loaded. Between these two metal bands I preferably interpose a solid rubber ring.

Figure 1:
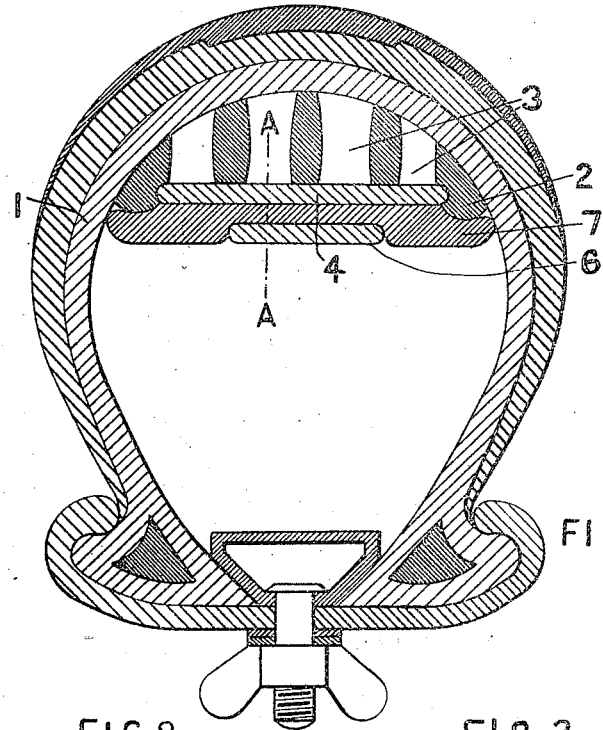
Figures 2, 3:
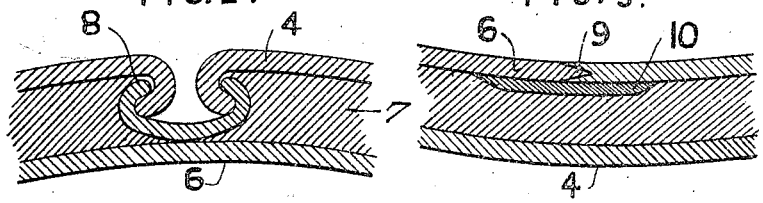
Figure 5:
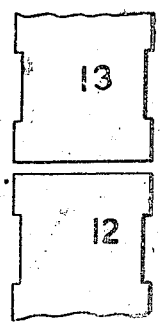
Figure 4:
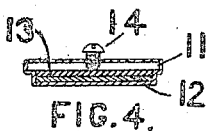
Figure 6:
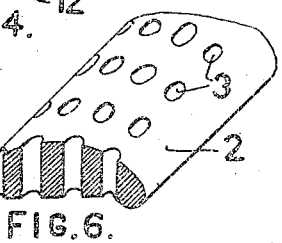

In the annexed drawing, Figure 1 is a cross section of a tire constructed in accordance with the principles of my said invention, Figs. 2 and 3 are different longitudinal sections on a larger scale along A—A in Fig. 1, Figs. 4 and 5 show a method of connecting up two segments of the circumferential metal band used in connection with my improved tire, Fig. 6 is a perspective view of a part of the rubber ring or pad interposed between said metal band and the ordinary tire cover, Figs. 7, 8, 9 and 10 show another method for connecting up two segments, or the two ends, of the outer circumferential metal band, and also means for connecting the ends of the inner metal band.

In Fig. 1, 1 is the cover, 2 the rubber ring or pad, 3 the radial perforations therein, and 4 the metal band for pressing the pad against the inner surface of the cover 1. Concentric with the band 4 is arranged a second metal band 6, and between the two bands 4 and 6 is interposed a solid rubber ring 7. The steel ring 6 is adapted to be strongly expanded in some suitable and well-known manner, so as to put the outer band 4 under tensional stress even if the wheel on which the tire is mounted should be subjected to a considerable load. For this purpose it may be built up of a plurality of segments which may be connected together in the manner as shown at 9 in Fig. 3, as this band 6 is only subjected to pressure. In order to prevent the ends of the segments of the band 6 from protruding into the rubber pad 7 when the said band, due to heavy loads, assumes an eccentric position or is somewhat deformed, I preferably provide for a steel plate 10 between the said ends and the pad 7.

As to the segments of the outer steel band 4, these should, in the form of embodiment shown in Fig. 1, be so connected up one with the other that the coupling formed may be proof against tensional stresses. According to Fig. 2 the ends of two adjacent segments may be bent inwardly, and kept together by a hook-shaped element 8. I however prefer a coupling as shown in Figs. 4 and 5, comprising a strap 11, having a top portion with a width equal to that of the segments 12, 13, and a bottom portion which is slightly narrower. The segments 12, 13 have cut-away portions or recesses near their ends (Fig. 5), the length of these portions slightly exceeding that of the strap 11. It will be readily understood that two segments thus formed may be introduced lengthwise into the top part, and that their narrower portions may be pressed downward into the bottom part of the strap 11, a screw 14 serving the purpose of firmly securing the segments.

It is not necessary to build up the band 4 of a plurality of segments; it may be made of one single steel spring plate bent to the required circular shape and whose ends may be connected in some suitable manner. If this band is to be mounted within the cover 1, its diameter is permitted to be reduced by simply allowing its ends to slide one along the other; it may then be put in place and be allowed to resume its original shape for exerting the required pressure on the cover of the tire.

When using such a circumferential metal band 4 a strap 17 as shown in Fig. 7 may be used for connecting up its ends and at the same time holding the inner band 6. For this purpose the two ends 12, 13 of the spring plate 4 are tapered as shown in Fig. 8, the end 12 being provided at both sides with a cut-away portion or recess 15 of rectangular section, and the other, 13, with corresponding recesses 16 having in cross-section the shape of a trapezoid (see Fig. 8). The interior part of the strap 17 has such a width that the two ends 12, 13 of the band 4 may lengthwise be introduced therein; the sides of the strap being provided with projections 18 having a form corresponding to that of the recesses 15 and 16 combined. It is clear that the ends 12 and 13 of the band 4, after having been introduced into the strap 17 and after the resilient pad 7 and the second band 6 have been put into their proper positions, may be moved toward the exterior narrower part of the strap 17, so that the projections 18 engage the recesses 15, 16, after which the ends 12, 13 may be pressed one onto the other and the different parts secured by means of a screw 19. This screw may be made as shown in Fig. 9, i. e. be provided with a square hole 20, so that it may be turned by means of a suitable key. The two ends of the inner band 6 are preferably provided with semi-circular recesses 21 (see Fig. 10) forming together a circular recess on the joint for the reception of a reduced end portion 22 of the screw 19.

According to Fig. 7 the two ends of the inner band 6 and those of the outer band 4 are connected by one and the same strap 17, the ends of the band 6 being clamped by the shoulder at the bottom of the member 19.

In order to permit the straps 11 or 17 to be placed in position the pad 2 and ring 7 are provided with recesses at the desired points to receive the ends of the straps 17 which are placed on the inside of the ring 4, and to receive the strap 11 which surrounds the ring 4 and has its wider portion placed on the inside of the said ring.

The ring formed by the elements 4, 6 and 7 constitutes a resilient and yet comparatively stiff member which keeps the lateral portions of the cover 1 well stretched.

If by means of the additional metal band 6 the band 4 is subjected to tensional stress only, the latter has a tendency of always assuming a perfectly circular shape; these means further allow of the tread of the cover and the rubber pad 2 to be of a comparatively yielding nature, which is essential for obtaining a resilient tire.

It will of course be understood that, although I have herein described the pad 2 and the pad 7 as being made of rubber, there are many other materials which I may use for the purpose of carrying out my invention.

What I claim is:

1. A resilient tire for a vehicle wheel comprising in comination a flexible cover, a resilient pad formed to fit within said cover, a metal band adapted to be pressed against the inner periphery of the said resilient pad, and a second metal band located within the first mentioned band and adapted to put the same under tensional stress.

2. A resilient tire for a vehicle wheel comprising in combination a flexible cover, a resilient pad formed to fit within said cover, a metal band adapted to be pressed against the inner periphery of the said resilient pad, and a second metal band located within the first mentioned band, the said second band being built up of a plurality of segments and adapted to exert a pressure on the outer band.

3. A resilient tire for a vehicle wheel comprising in combination a flexible cover, a resilient pad formed to fit within said cover, a metal band adapted to be pressed against the inner periphery of the said resilient pad, a second metal band located within the first mentioned band and adapted to put the same under tensional stress, and a second resilient pad located between the outer and inner metal bands.

4. A resilient tire for a vehicle wheel comprising in combination a flexible cover, a resilient pad formed to fit within said cover, a metal band adapted to be pressed against the inner periphery of the said resilient pad, and a second metal band located within the first mentioned band and adapted to put the same under tensional stress, the said first mentioned band being built up of segments provided near their ends with cut-away portions formed to receive straps by which such ends are adapted to be secured.

In testimony whereof I have affixed my signature in presence of two witnesses.

ARNO BOERNER.

Witnesses:
D. KLEYÏN,
M. ALVARADO.